INVENTOR
VILGOT RAYMOND NILSSON

BY
Davis, Hoxie, Faithfull & Hapgood
ATTORNEYS.

3,443,577
APPARATUS FOR CONTROLLING GRAVITY FLOW
Vilgot Raymond Nilsson, Hatersten, Sweden, assignor to Alfa-Laval AB, Tumba, Sweden, a corporation of Sweden
Filed Oct. 19, 1966, Ser. No. 587,866
Claims priority, application Sweden, Oct. 21, 1965, 13,633/65
Int. Cl. F16k 9/00, 13/00
U.S. Cl. 137—209                                                      5 Claims

ABSTRACT OF THE DISCLOSURE

A tapping pipe has an orifice opening into an upper container and is arranged for delivering liquid therefrom to a lower container, and means are provided for connecting this pipe to a pressure source to create in the pipe a pressure independent of the liquid levels in the container and at least as great as the hydrostatic pressure prevailing at the orifice, thereby blocking gravity flow through the pipe. A device is operatively connected to the pipe for releasing the internal pressure to unblock the flow.

THE DISCLOSURE

This invention relates to apparatus in which liquid is adapted to flow from an upper container through a tapping pipe to a lower container. More particularly, the invention relates to such apparatus having improved means for controlling the liquid flow through the tapping pipe.

Particularly in the chemical industry, it is often desired to tap a liquid from a higher to a lower container in a very short time. This means that very large quantities of liquid may have to be handled per unit of time, so that the tapping device must have a correspondingly large dimension and large valve, and the valve may have to be operated by a servo-motor. Thus, the tapping means are obviously expensive and bulky.

An object of the present invention is to provide means for tapping very large quantities of liquid per unit of time, which means are simpler, less costly and bulky, and more easily operated than means previously available for this purpose.

According to the invention, a tapping pipe leads from the upper to the lower container, and a pressure source is connected to the tapping pipe to provide it with an internal pressure at least equal to the hydrostatic pressure prevailing at the orifice through which the pipe opens into the upper container, thereby blocking flow of liquid from the upper container through the tapping pipe to the lower container. The invention also comprises a device for releasing this internal pressure in the pipe so that it becomes less than the hydrostatic pressure at the orifice, thereby unblocking said flow.

Figure 1:
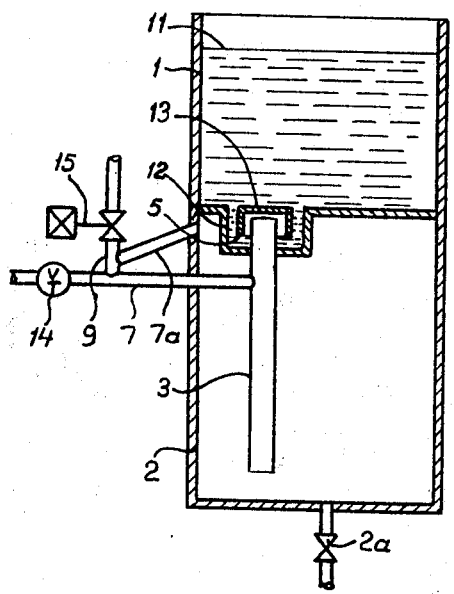
Figure 2:
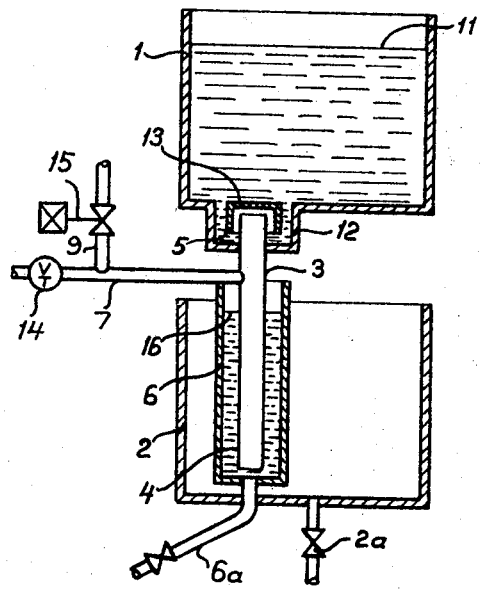
Figure 3:
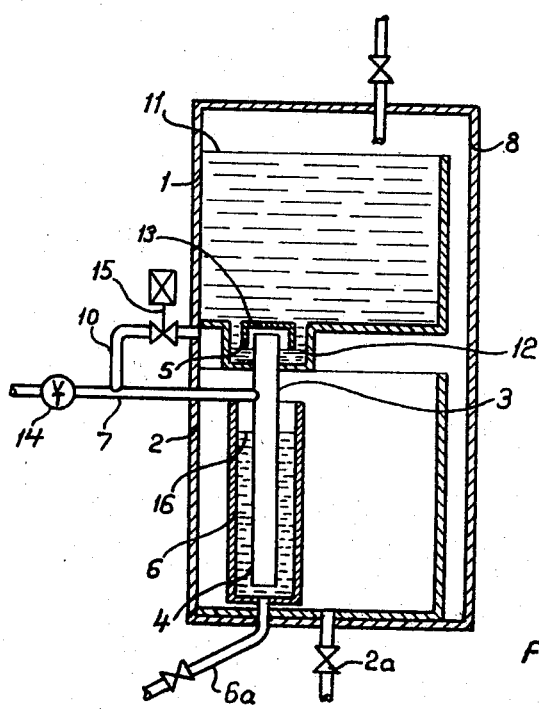

For a better understanding of the invention, reference may be had to the accompanying drawing in which:

FIG. 1 is a vertical sectional view, partly in elevation, of one embodiment of the invention, and FIGS. 2 and 3 are similar views of other embodiments.

In the drawing, reference numeral 1 indicates an upper container containing a liquid 11 which is to be tapped rapidly down into a lower container 2. A tapping pipe 3 leads from the container 1 to the container 2. The pipe 3 opens into a deep portion 12 in the bottom of the upper container 1, where a cap 13 receives the upper end portion of the pipe to provide it with a downwardly directed orifice 5. Thus, the cap 13 has the same effect as bending the upper end portion of the pipe 180°, which can be done if it is desired to eliminate the cap. The deep portion 12 makes it possible to empty the container 1 completely. The cap 13 may be secured to either the pipe 3 or the container.

In the embodiment shown in FIG. 1, the container 1 is open, while the container 2 is closed. A conduit 7 leads from a source of pneumatic pressure (not shown) to the tapping pipe 3 in lower container 2, this conduit having a throttle valve 14. Thus, through throttle 14 and conduit 7, both the pipe 3 and the container 2 are provided with an internal pressure which is equal to or higher than the pressure prevailing at the orifice 5 of the tapping pipe in the higher situated container 1. The conduit 7 may be supplemented by a branch conduit 7a leading directly into container 2, although it will be apparent that either of these conduits alone will suffice to provide tapping pipe 3 with the aforesaid internal pressure. As a result of that pressure, liquid in the upper container 1 cannot rise into the cap 13, and consequently the tapping from the container 1 cannot take place.

A branch pipe 9 leading from the conduit 7 is provided with a solenoid valve 15 which, when closed, retains the aforesaid pneumatic pressure in pipe 3, thereby blocking the flow of liquid from upper container 1. However, opening of valve 15 releases this pressure to atmosphere. More particularly, when solenoid valve 15 is opened, an equalization of the difference between the atmospheric pressure and the pressure in container 2 (and consequently the pressure in the tapping pipe 3) takes place because due to the throttle 14, the source of pressure cannot maintain the pressure in the container 2 after the valve 15 has been opened. The liquid in the container 1 can now flow rapidly downward into the container 2 through the tapping pipe 3, the throughflow area of which is comparatively large. Liquid can be drained from container 2 through an outlet valve 2a.

During the filling of upper container 1, valve 15 is kept closed, and air supplied through conduit 7 may bubble through the liquid in container 1 until the liquid in that container reaches a level such that the hydrostatic pressure at orifice 5 at least balances the pneumatic pressure in cap 13. However, until valve 15 is opened, the pneumatic pressure in pipe 3 and cap 13 will always be sufficient to prevent liquid in container 1 from rising in cap 13 to the open top of pipe 3.

In the embodiment shown in FIG. 2, the higher situated container 1 as well as the lower situated container 2 are open. In this embodiment, the tapping pipe 3 extends down into a cylinder 6 containing liquid which forms a liquid trap for the tapping pipe. This liquid trap is dimensioned so that the lower end of the tapping pipe 3 can be put under a hydrostatic pressure (due to the liquid in cylinder 6) which is equal to that prevailing at the orifice 5 of the tapping pipe in the upper container. By means of the connection 7 to the pneumatic pressure source, the tapping pipe 3 can be provided with an internal pressure which is equal to or higher than the pressure prevailing at the orifice 5 in the upper container, thereby blocking fluid flow from the upper to the lower container as previously described. By opening the solenoid valve 15 in branch pipe 9, an equalization takes place, as described above, between the pressure in the tapping pipe 3 and the surrounding atmospheric pressure, so that the liquid 11 in the upper container flows rapidly down into the lower container by way of tapping pipe 3 and trap 6.

When filling the upper container 1, the cylinder 6 is first filled with liquid to a depth approximating the depth to which the upper container is to be filled, whereby the lower end of pipe 3 is placed under a hydrostatic pressure equal to that at orifice 5 when the upper container is filled. For this purpose, a valved pipe 6a may be provided for introducing liquid into the cylinder to the required level and for withdrawing liquid from the cylinder when desired. Container 1 is then filled as previously described in connection with FIG. 1.

While the containers 1 and 2 are shown open in FIG. 2, either or both of them can be closed, in which case the liquid trap 6 is dimensioned so that the hydrostatic pressure prevailing at the lower end 4 of the tapping pipe, increased by the gas pressure prevailing above the liquid level 16 of the liquid trap, is at least equal to the hydrostatic pressure at the orifice 5 of the tapping pipe in the upper container, increased by the gas pressure prevailing above the liquid 11. By providing tapping pipe 3, through connection 7 to the source of pressure, with an internal pressure which is equal to or higher than the pressure prevailing at the orifice 5, liquid flow from the container 1 to the container 2 is blocked, as previously described; and tapping is started by opening the solenoid valve 15 of the branch pipe 9.

In the embodiment shown in FIG. 3, the upper container 1 and the lower container 2 are both open but are enclosed in a common outer envelope 8. Otherwise, the arrangement is essentially the same as that shown in FIG. 2. In FIG. 3, however, the equalization of the difference between the internal pressure in the tapping pipe 3 and in the envelope 8 is effected by a pipe 10 branching from the conduit 7 (connected to the source of pressure) and leading to the outer envelope 8. When the solenoid valve 15 is opened, the outer envelope 8 is put under the same internal pressure as the tapping pipe 3, thus starting the tapping from the upper container to the lower container.

In the embodiments previously described, it has been assumed that conduit 7 is connected to a source of pneumatic pressure; but it will be understood that the pressure source may supply pressure other than pneumatic. For example, in the arrangement shown in FIG. 2, the source of pressure can be adapted to supply a liquid instead of air, such as a re-circulated portion of the liquid previously processed in the apparatus.

I claim:

1. The combination of upper and lower containers, a tapping pipe for delivering liquid from the upper container to the lower container, said pipe having an orifice opening into the upper container, means associated with said pipe to provide the pipe with an internal pressure independent of the liquid levels in the containers and at least as great as the hydrostatic pressure prevailing at said orifice, thereby blocking flow of liquid through the pipe from said upper container, and a device operatively connected to the pipe for releasing said internal pressure to unblock said flow.

2. The combination according to claim 1, in which at least one of said containers is closed.

3. The combination according to claim 1, in which at least one of said containers is open.

4. The combination according to claim 1, comprising also a liquid trap through which the lower end of said pipe communicates with the lower container, said trap being operable to place said lower end under a hydrostatic pressure which, increased by the gas pressure prevailing above the liquid level of said trap, is at least equal to the hydrostatic pressure at said orifice increased by the gas pressure prevailing above the liquid level of the upper container.

5. The combination according to claim 4, in which said containers are open, the combination comprising also an outer envelope enclosing said containers, and means for subjecting said envelope to an internal pressure equal to that prevailing in said pipe.

References Cited

UNITED STATES PATENTS

| | | | |
|---|---|---|---|
| 210,965 | 12/1878 | Rhoads | 137—138 XR |
| 753,174 | 2/1904 | Smith | 137—136 XR |
| 2,118,532 | 5/1938 | Widmann | 137—575 XR |

FOREIGN PATENTS 418,152   9/1910   France.

DANIEL BLUM, *Primary Examiner.*

U.S. Cl. X.R.

137—571